(12) United States Patent
Koteles et al.

(10) Patent No.: US 6,654,533 B1
(45) Date of Patent: Nov. 25, 2003

(54) POLARIZATION INDEPENDENT WAVEGUIDE STRUCTURE

(75) Inventors: Emil S. Koteles, Ottawa (CA); Jian-Jun He, Ottawa (CA); Michael Davies, Ottawa (CA)

(73) Assignee: Metrophotonics Inc., Ottawa (CA)

( * ) Notice: Subject to any disclaimer, the term of this patent is extended or adjusted under 35 U.S.C. 154(b) by 70 days.

(21) Appl. No.: 09/669,765

(22) Filed: Sep. 26, 2000

Related U.S. Application Data (60) Provisional application No. 60/211,961, filed on Jun. 16, 2000.

(51) Int. Cl.$^7$ .............................. G02B 6/10; H01L 21/00
(52) U.S. Cl. ......................................... 385/131; 438/31
(58) Field of Search ................... 385/11, 14, 129–132; 438/31

(56) References Cited

U.S. PATENT DOCUMENTS

| | | | |
|---|---|---|---|
| 5,502,787 A | * | 3/1996 | Capasso et al. ............. 385/123 |
| 5,539,850 A | * | 7/1996 | Henry et al. ................... 385/48 |
| 5,623,571 A | | 4/1997 | Chou et al. |
| 5,703,980 A | * | 12/1997 | MacElwee et al. ........... 385/30 |
| 5,732,179 A | * | 3/1998 | Caneau et al. .............. 385/131 |
| 5,910,012 A | | 6/1999 | Takeuchi |
| 5,937,113 A | | 8/1999 | He et al. |
| 6,036,771 A | | 3/2000 | Sakata |
| 6,040,246 A | | 3/2000 | Goldstein et al. |
| 6,052,213 A | | 4/2000 | Burt et al. |
| 6,052,397 A | | 4/2000 | Jeon et al. |
| 6,064,783 A | | 5/2000 | Congdon et al. |
| 6,376,272 B1 | * | 4/2002 | Bond et al. .................... 438/31 |

FOREIGN PATENT DOCUMENTS

JP 05257017 10/1993

OTHER PUBLICATIONS

Gini et al., "Polarization Independent InP WDM Multiplexer/Demultiplexer Module", Journal of Lightwave Technology, IEEE, Apr. 1, 1998, vol. 16, No. 4, pp. 625–630, New York, U.S.A.

Yoshimoto et al., "Highly efficient coupling semiconductor spot–size converter with an InP/InAlAs multiple–quantum–well core", Applied Optics, Optical Society of America, Feb. 20, 1995, vol. 34, No. 5, pp. 1007–1014, Washington, U.S.A.

Polarization–insensitive arrayed waveguide grating wavelength multiplexer on silicon by H. Takahashi, Y. Hibino, and I. Nishi, Opt. Lett., vol. 17, No. 7, pp. 499–501, Apr. 1992.

Polarization–independent InP arrayed waveguide filter using square cross–section waveguides by . B. D. Soole, M. R. Amersfoort, H. P. Leblanc, N. C. Andreadakis, A. Raijhel, C. Caneau, M. A. Koza, R. Bhat, C. Youtsey, and I. Adesida,, Electron. Lett., vol. 32, pp. 323–324, 1996.

(List continued on next page.)

Primary Examiner—Brian Healy
Assistant Examiner—Sarah U Song
(74) Attorney, Agent, or Firm—Freedman & Associates (57) ABSTRACT

A homogeneous semiconductor waveguide structure having an undoped core layer and doped cladding layers on both sides of the core layer is proposed wherein the waveguide core is substantially thick providing polarization independence. Because of the cladding layers having low refractive index contrast with respect to the core and being on opposing sides resulting in a substantially symmetrical structure, the waveguide, can be made single-mode with low polarization sensitivity, thus improving characteristics for conducting light therein. Furthermore, the enlarged mode size increases coupling efficiency. Also, since the waveguide is grown from a single semiconductor composition lattice matched to the substrate, wafer uniformity and reproducibility are enhanced. The three layer structure reduces birefringence sufficiently that a yield enhancing etch stop layer can be added to the structure without substantially adverse effects.

29 Claims, 6 Drawing Sheets

OTHER PUBLICATIONS

Polarization compensated waveguide grating router on InP by P. C. Chou, C. H. Joyner, M. Zirngibl, Electron. Lett., vol. 31, pp. 1662–1664, 1995.

Polarization independent 8.times.8 waveguide grating multiplexer on InP by M. Zirngibl, C. H. Joyner, L. W. Stulz, Th. Gaigge and C. Dragon, Electron. Lett., vol. 29, pp. 201–201, 1993.

Design and realization of polarization independent phased array wavelength demultiplexers using different array order for TE and TM by L. H. Spiekman, M. R. Amersfoort, A. H. de Vreede, F. P. G. M. van Ham, A. Kuntze, J. W. Pedersen, P. Demeester, and M. K. Smit, J. Lightwave Technol., vol. 14, pp. 991–995, 1996.

16 channel phased array wavelength demultiplexer on InP with low polarization sensitivity by H. Bissessur, F. Gaborit, B. Martin, P. Pagnod–Rossiaux, J. L. Peyre and M. Renaud,, Electron. Lett., vol. 30, pp. 336–337, 1994.

Monolithic integrated wavelength demultiplexer based on a waveguide Rowland circle grating in InGaAsP/InP by J.–J. He, et al., IEEE J. Lightwave Tech, vol. 16, pp. 631–638, 1998.

Polarization independent WDM multiplexer/demultiplexer module by Gini, W. Hunziker, and H. Melchior, J. Lightwave Tech, vol. 16, pp. 625–630, 1998.

Flat–Field Spectrograph in SiO2/Si by P.C. Clemens et al, IEEE Photonic Tech. Letters Vol 4, No. 8, pp 886–887 (1992).

8–Channel Optical Demultiplexer Realized as Sio2/Si Flat–Field Spectrograph by P.C. Clemens et al, IEEE Photonic Tech. Letters Vol 6, No. 9, pp 1109–1111 (1994).

InGaAs photodiode arrays for DWDM monitoring and receiving by Marshall J. Cohen et al., Lightwave, Aug. (1999).

* cited by examiner

POLARIZATION INDEPENDENT WAVEGUIDE STRUCTURE

This application claims the benefit of provisional application Ser. No. 60/211,961 filed Jun. 16, 2000.

FIELD OF THE INVENTION

The invention relates generally to semiconductor optical waveguides and more particularly to a thick semiconductor optical waveguide that is substantially polarization independent, has increased coupling efficiency to optical fiber and superior uniformity and reproducibility.

BACKGROUND OF THE INVENTION

Fiber optic communication systems have gained widespread acceptance over the past few decades. With the advent of optical fiber, communication signals are transmitted as light propagating along a fiber supporting total internal reflection of the light propagating therein. Many communication systems rely on optical communications because they are less susceptible to noise induced by external sources and are capable of supporting very high speed carrier signals and increased bandwidth. Unfortunately, optical fiber components are bulky and often require hand assembly resulting in Sawer yield and higher costs. One modern approach to automating manufacture in the field of communications is integration. Integrated electronic circuits (ICs) are well known and their widespread use in every field is a clear indication of their cost effectiveness and robustness. A similar approach to optical communication components could prove very helpful.

In an attempt to integrate optical components, manufacturers try to miniaturise optical systems within a single chip. For example, an InP structure can be formed on a substrate and can act as a waveguide for conducting an optical signal. Typically, the waveguide structure is thin and acts as a two dimensional waveguide, thereby effecting polarization of a signal guided therein. In order to provide polarization independence, several approaches exist.

Integrated wavelength multi/demultiplexers are important components for wavelength division multiplexing (WDM) optical communication systems. Integration offers the advantages of compactness, reliability, and reduced packaging costs. Further, implementation in a semiconductor material, particularly the InGaAsP/InP system important for optical fiber communications systems, would permit monolithic integration of these passive devices with active ones, such as lasers, modulators, optical switches, and detectors, resulting in sophisticated wavelength sensitive photonic integrated circuits with complex functionalities.

As described above, one of the major drawbacks in an integrated wavelength multi/demultiplexers is the polarization sensitivity of the device. Since an optical signal propagating through an optical fiber has an indeterminate polarization state, the switching/routing devices must be substantially polarization insensitive. However, planar waveguides usually have different propagation constants for TE (transverse electric) and TM (transverse magnetic) waveguide modes. For wavelength multi/demultiplexers, this difference in propagation constants results in a wavelength shift in the spectral response peak or the passband of each wavelength channel. This wavelength shift is sensitive to the design of the planar waveguide, and can be as large as 3 nm or more. As WDM systems are being designed towards smaller and smaller channel spacing—currently from 1.6 nm to 0.8 nm and even less in the future, even a small polarization dependent wavelength shift (e.g. 0.3–0.4 nm) is of concern.

Two types of integrated wavelength multi/demultiplexers that have been widely investigated art; phased waveguide arrays and etched grating-on-a-chip spectrometers. Grating based devices require high quality, deeply etched grating facets. The optical loss of the device depends critically on the verticality and smoothness of the grating facets. However, the size of the grating device is much smaller than the phased array and the spectral finesse is much higher due to the fact that the number of teeth in the grating is much larger than the number of waveguides in the phased array. This allows the grating based device to have a larger number of channels available over its free spectral range (FSR) and consequently can he scaled-up easily to high density operation.

In waveguide array based devices, several approaches have been used to compensate for the polarization sensitivity; for example the insertion of a half wave plate in the middle of the waveguides array is described by H. Takahashi, Y. Hibino, and I. Nishi, in a paper entitled "Polarization-insensitive arrayed waveguide grating wavelength multiplexer on silicon", Opt. Lett., vol. 17, no. 7, pp. 499–501, 1992. Alternatively, the use or non-birefringent waveguides with a square cross section has been described by J. B. D. Soole, M. R. Amersfoort, H. P. Leblanc, N. C. Andreadakis, A. Raijhel, C. Caneau, M. A. Koza, R. Bhat, C. Youtsey, and 1. Adesida, in a paper entitled "Polarization-independent lnP arrayed waveguide filter using square cross-section waveguides", Electron. Lett., vol. 32, pp. 323–324, 1996. Birefringence compensation using two different rib waveguides has been described by P. C. Chou, C. H. Joynerm M. Zimgibl, in U.S. Pat. No. 5,623,571 entitled "Polarization compensated waveguide orating router". In the '571 patent the polarization compensation is not within the slab waveguiding region. This technique requires either two regrowth steps as described in the patent and in a paper by the same authors entitled "Polarization compensated waveguide grating router on InP", Electron. Lett., vol. 31, pp. 1662–1664, 1995, or two etching steps as described by C. G, M. Vreeburg, C. G. P. Herben, X. J. M. Leijtens, M. K. Smit, F. H. Groen, J. J. G. M. van der Tol and P. Demeester, in a paper entitled "An improved technology for eliminating, polarization dispersion in integrated phasar demultiplexers", in Proc. 23.sup.rd Conf. on Optical Comm. (FCOC'97), pp. 3.83–3.86, Edinburgh, UK, 1997. In addition to increases complexity in fabrication process, the reduced cladding layer thickness in the polarization compensating rib/ridge waveguides resulted in a reduced lateral index contrast, and consequently increased phase errors due to enhanced coupling between adjacent waveguides. In order to avoid radiation loss due to reduced index contrast, the polarization compensating waveguides need to he implemented in straight waveguide section, which leads to an additional straight section length of the arrayed waveguides and consequently a larger device size:. Yet another alternative in the attempt to overcome polarization sensitivity is dispersion matching with adjacent diffraction orders which has been described by M. Zirngibl, C. H. Joyner, I. W. Stulz, Th. Gaigge and C. Dragone, in a paper entitled "Polarization independent 8.times.8 waveguide grating multiplexer on InP", Electron. Lett., vol. 29, pp. 201–201, 1993, and by L. H. Spiekman, M. R. Amersfoort, A. H. de Vreede, F. P. G. M. van Ham, A. Kuntze, J. W. Pedersen, P. Demeester, and M. K. Smit, in a paper entitled; "Design and realization of polarization independent phased array wavelength demultiplexers using different array order for TE and TM", J. Lightwave Technol., vol. 14, pp. 991–995, 1996. Another approach is that of using layer structures with low birefringence by using thick guiding layer and low refractive index contrasts has been described by H. Bissessur, F. Gaborit, B. Martin, P. Pagnod-Rossiaux, J. L. Peyre and M. Renaud, in a paper entitled "16 channel phased array wavelength demultiplexer on InP with low polarization sensitivity", Electron. Lett., vol, 30, pp. 336–337, 1994.

For diffraction grating based wavelength multi/demultiplexers, only the last two approaches are possible. In the polarization compensation method which attempts to match the TE and TM passband to two adjacent diffraction orders, the tree spectral range (FSR) of the grating needs to be chosen equal to the wavelength split between the to modes. In this case, the passband corresponding to the mth-order for TE will overlap with the (m-1)th order for TM. A severe drawback of this method is that the available FSR for WDA channels is limited by the polarization split, which is determined by the waveguide layer structure. It is usually limited to a few nanometers. A large polarization split is preferable in this case. In addition, since the polarization dispersion is very sensitive to the exact layer composition and thickness, it is difficult to obtain a good match due to the non-uniformity and non-reproducibility of wafer growths. Another method for achieving polarization insensitive operation in diffraction grating based wavelength multi/demultiplexer is to use a birefringence-reduced layer structure, combined with an input/output waveguide design for a flattened channel response. Polarization dispersion as small as 0.3–0.4 nm has been obtained with InGaAsP/InP double heterostructures as is described by J.-J. He. B. Lamontagne, A. Delage, I. Erickson, M. Davies, and E. S. Koteles, in a paper entitled "Monolithic integrated wavelength demultiplexer based on a waveguide Rowland circle grating in lnGaAsP/InP", J. Lightwave Tech, vol. 16, pp. 631–638, 1998. Lower birefringence waveguides can be designed by using a thick guiding layer and low refractive index contrast between the guiding layer and the cladding layer. However, low index contrast InGaAsP/lnP layers are very difficult to grow in practice. One way to obtain low index contrast waveguides is to use homogenous InP with different doping levels for the guiding and cladding layers, as suggested by Gini, W. Hunziker, and H. Melchior, in a paper entitled "Polarization independent WDM multiplexer/demultiplexer module", J. Lightwave Tech, vol. 16, pp. 625–630, 1998, incorporated herein by reference. A somewhat polarization independent waveguide structure having a thick InP waveguide and etched according to a process disclosed therein is proposed. The authors disclose that the waveguide is approximately polarization independent. In reality, the elliptical mode of the waveguide disclosed as well as other factors result in substantial polarization dependence. The residual polarization dispersion is still as large as 0.1 nm. In U.S. Pat. No. 5,937,113 in the names of He et. al. And issued Aug. 10, 1999, a small perturbation in a waveguide structure formed by etching, doping, or ion implantation allows for a more polarization independent operation of the waveguide. Such a system is advantageous as polarity of signals propagating through the waveguide structure are insignificant to waveguide operation. However, the waveguide core layer is generally thin in order to keep the waveguide single-mode as required for the device application. This results in a large fiber-to-waveguide coupling loss due to the mode mismatching.

It would be advantageous to produce a symmetric, and large-size waveguide structure that is substantially polarization independent and at the same time has a good mode-matching with standard optical fiber.

OBJECT OF THE INVENTION

It is an object of the invention to provide a semiconductor waveguide structure that is approximately symmetrical for enhancing polarization independence thereof and for improving the fiber-waveguide coupling efficiency.

SUMMARY OF THE INVENTION

In an attempt to overcome these and other limitations of the prior art, a homogeneous semiconductor waveguide structure is provided having a substrate, a core waveguide layer formed on the substrate and being a thick waveguide, and a further layer of substrate material on the core waveguide layer such that the resultant waveguide is substantially symmetrical to an optical signal propagating therein. According to an embodiment, the core waveguide material is undoped InP and the substrate is a doped InP substrate. Advantageously, an optical signal propagating in the core of the waveguide structure encounters a similar environment on each side of the core.

In an embodiment the invention provides a semiconductor wave guide structure comprising:

a substrate including a first doped cladding layer having a first index of refraction;

a thick undoped waveguide core layer disposed on the substrate in contact with the first doped cladding layer and in contact therewith, having a thickness of at least 2 $\mu$m, and having an index of refraction higher than that of the first doped cladding layer; and, a second doped cladding layer having an index of refraction similar to that of the first doped cladding layer and disposed on an opposing side of the waveguide cure layer to the first doped cladding layer.

BRIEF DESCRIPTION OF THE DRAWINGS

Exemplary Embodiments of the invention, will now be described, in conjunction with the drawings, in which.

DETAILED DESCRIPTION OF THE INVENTION

Figure 1:
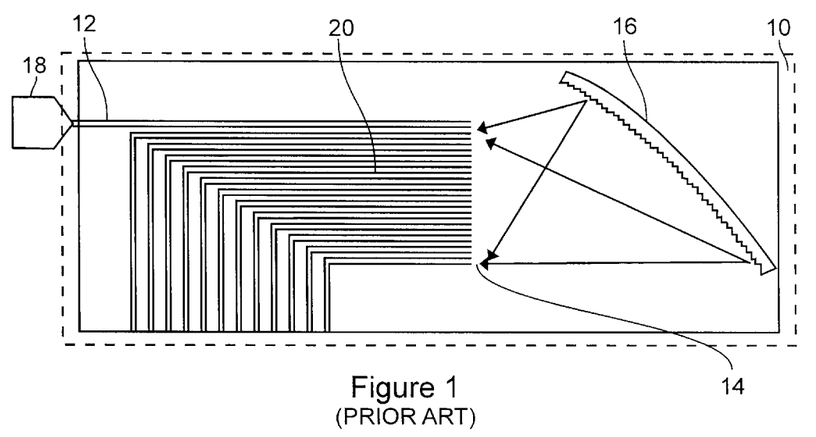
FIG. 1 is a prior art schematic diagram of an integrated waveguide diffraction grating device.
Figure 2:
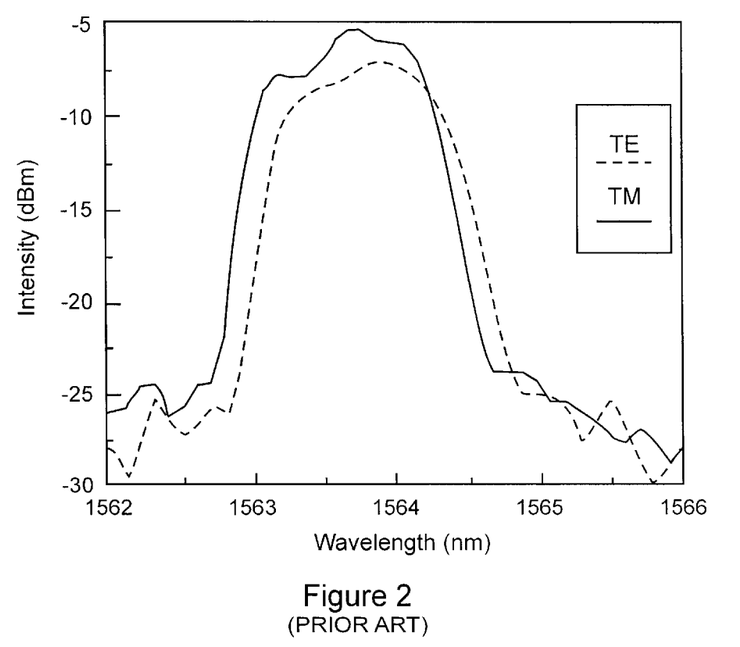
FIG. 2 is a graph to intensity versus wavelength for TE and TM polarized light shown to have their spectrums relatively shifted for the device of FIG. 1.

Recurring now to prior art FIG. 1 a schematic of a typical wavelength demultiplexers 10 based on an integrated diffraction grating is shown. It consists of input/output waveguide arrays 12, 14 and an etched diffraction grating 16. The incoming optical signals of different wavelengths are coupled from an optical fiber 18 to the input end of the input waveguide of the demultiplexer. At the end of the input waveguide, the light diverges into the slab waveguide and is then focused back to the inputs of the output waveguides by the curved echelle grating. Due to the dispersive property of the diffraction grating 16, light signals of different wavelengths are focused onto different output waveguides. For a given wavelength, the position of the focused spot, for example the location 20, depends on the effective index of the slab waveguide, in addition to geometrical parameters of the grating. Because the effective indices of the slab waveguide are different for TL, and TM modes and hence the slab exhibits birefringence, the focused spots do not overlap for the two polarizations, resulting in a polarization dependent wavelength shift in the channels response function, as shown in FIG. 2. Here the wavelengths of the TE and TM modes are shown to be relatively shifted for a given channel. This polarization dependency produces intensity noise in the detected signal due to the polarization instability of the incoming optical signal from a fiber. It also increases the crosstalk between adjacent channels.

Figure 3:
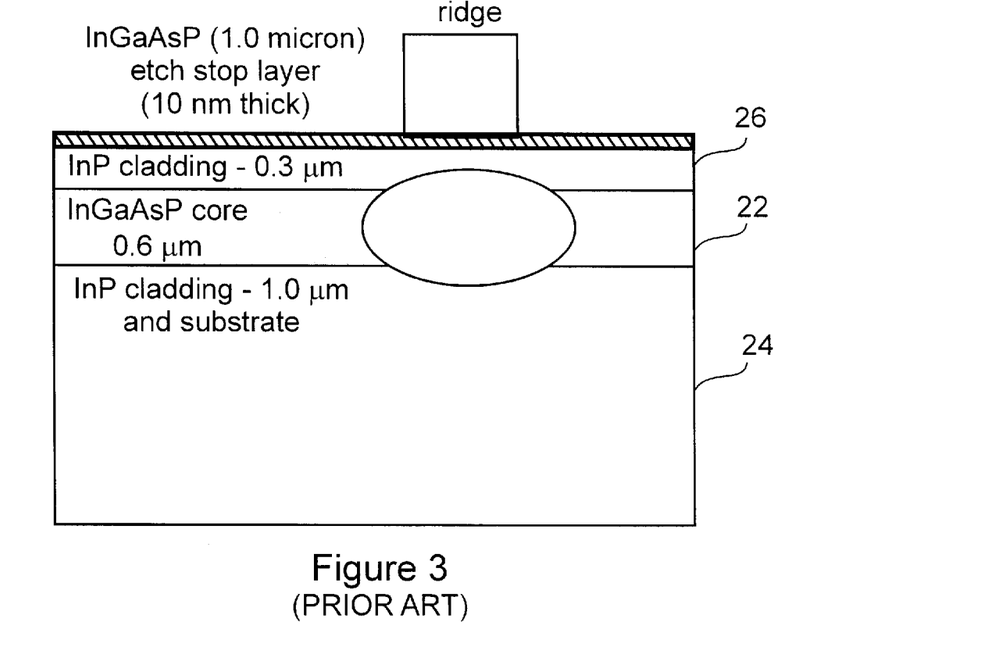
FIG. 3 is cross sectional view of a prior art thin waveguide structure.

Referring to FIG. 3 a semiconductor waveguide according to the prior art is shown in cross section. A substantially thin semiconductor waveguide core layer 22 topped by a cladding layer 26 of differing semiconductor composition is formed on a substrate 24. A signal propagating in the core layer does not propagate in a polarization independent manner. This is evident due to the planar (two-dimensional) nature of the waveguide.

Figure 4:
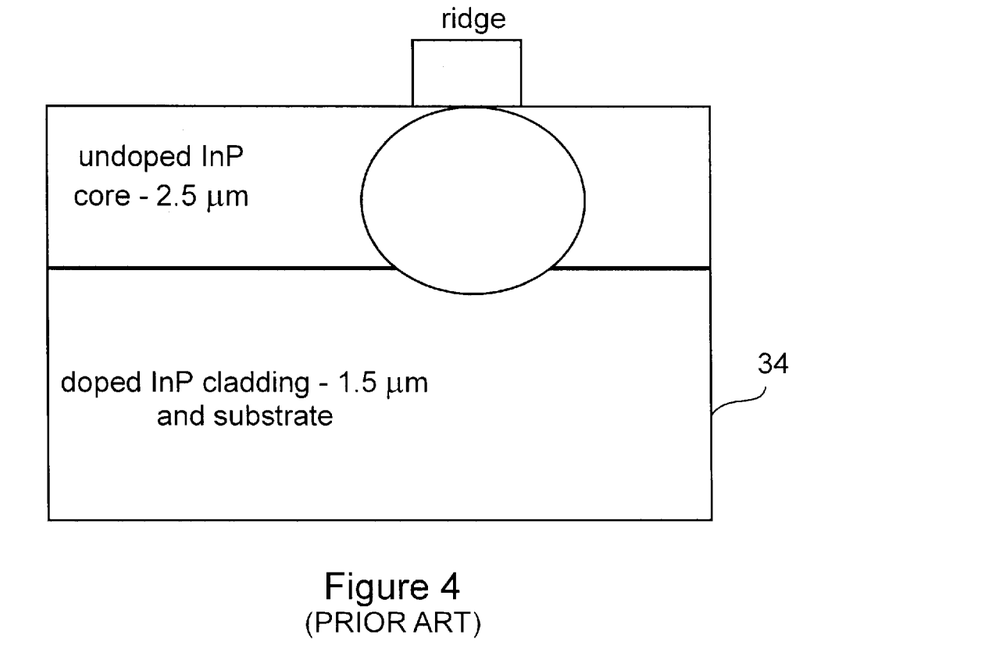
FIG. 4 is a cross sectional view of a prior art thick waveguide structure.

Referring to FIG. 4, a thick waveguide formed of InP is shown. A doped substrate layer of InP 34 acts as a cladding layer for an undoped core layer of InP. Etching of the undoped layer results in waveguides in that layer. As described in the article by Gini et al., supra, the thick waveguide has an optical mode providing for much less polarization dependence than the thin waveguide of FIG. 3. Though this is the case, the device is not truly polarization independent and, is asymmetrical, a property that affects polarization independence in specific and light propagation in general.

Figure 5:
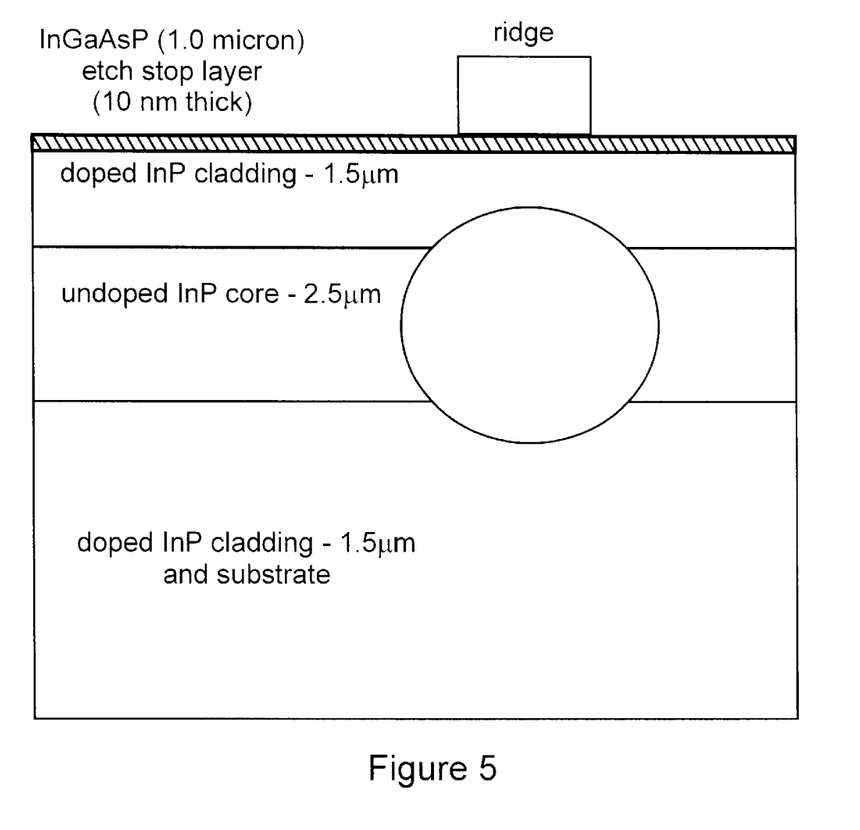
FIG. 5 is a cross-sectional diagram of a thick waveguide sandwiched between confining layers according to the invention.

Referring to FIG. 5, a thick waveguide similar to that of FIG. 4 is shown but now a third layer of material in the form of substrate material is deposited on the waveguide core. According to an embodiment, the waveguide core material is undoped InP and the substrate material is doped InP. The choice of InP was made because it facilitates integration of the optical waveguide device with active components operating at 1.55 μm, the wavelength of choice for optical telecommunications. The third layer is of a material similar to that of the substrate. As such the core appears symmetrical to optical signals propagating therein having a same interface on opposing .ides. The undoped region acts to conduct light therein confined by the doped layers. Typically, the undoped core layer is about 3 μM. Of course thicker or thinner layers are possible, but care should be taken when expanding the thickness to ensure that the waveguide is single-mode in the direction of the thickness and when making the layer thinner that polarization independence is sufficient for a desired application. Once again, because the cladding layers are nearly identical on opposing sides of the waveguide, the resulting symmetry provides for excellent polarization independence.

Advantageously, a wider mode waveguide has increased coupling efficiency.

Though the invention is described with reference to an InP waveguide structure, it is applicable with necessary limitations and modifications to other semiconductor waveguide materials, such as Galas. InP is preferable for implementation of the invention as active devices for optical communication at 1.55 μm can be integrated. Other 111-V compounds such as Galas are well suited to implementing the invention. It is also predicted that group 4 semiconductors such as silicon are well suited to implementation of the invention therein.

An example three layer structure consists of, from the surface, a 3 μm n-doped InP with a doping concentration of $1.3 \times 10^{18}/cm^3$, 1 μm undoped InP, 10 nm InGaAsP quaternary with a bandgap of 1.1 μm as an etch-stop layer, 2 μm undoped InP, and 3 μm n-doped InP with a doping concentration of $1.3 \times 10^{18}/cm^3$, grown on an InP substrate with a similar doping concentration.

Figure 6:
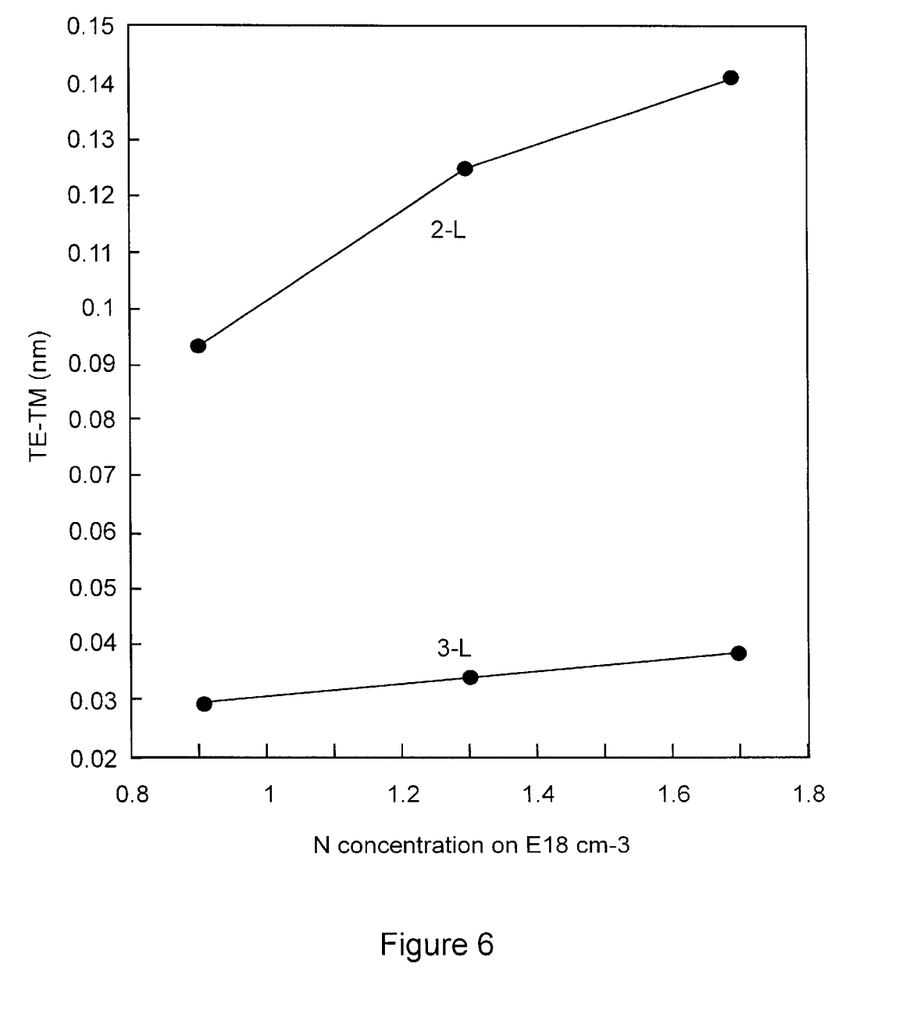
FIG. 6 is a plot of the birefringence induced splitting of the TE and TM modes for the two (2-L) and three (3-L,) layer structure waveguides as a function of the doping concentration in the cladding layers for a fixed, undoped core thickness.

The change in birefringent mode splitting (TE - TM) due to doping concentration is presented in FIG. 6 for both two and three layer thick waveguide structures. The undoped layer is fixed at 3.0 μm in this calculation. The only difference between these two structures was the presence of a symmetrical top cladding layer in the three layer waveguide. A significant reduction in birefringent splitting is evident in the three layer structure as opposed to the two layer structure. The average splitting corresponds to about 4% of 100 GHz low enough that this waveguide could be used in 100 GHz, and even 50 GHz spacing demultiplexers. In contrast, the average birefringence of 15% of 100 GHz present in two layer waveguides will be a serious problem in such demultiplexers. And their use in 50 GHz spacing demultiplexers is precluded. Furthermore, the birefringence splitting in the two layer structure changes much more rapidly with doping concentration than the three layer structure. Plus the three layer structure is much more tolerant of doping variations introduced during growth than the two layer structure implying higher fabrication yields for the former.

Figure 7:
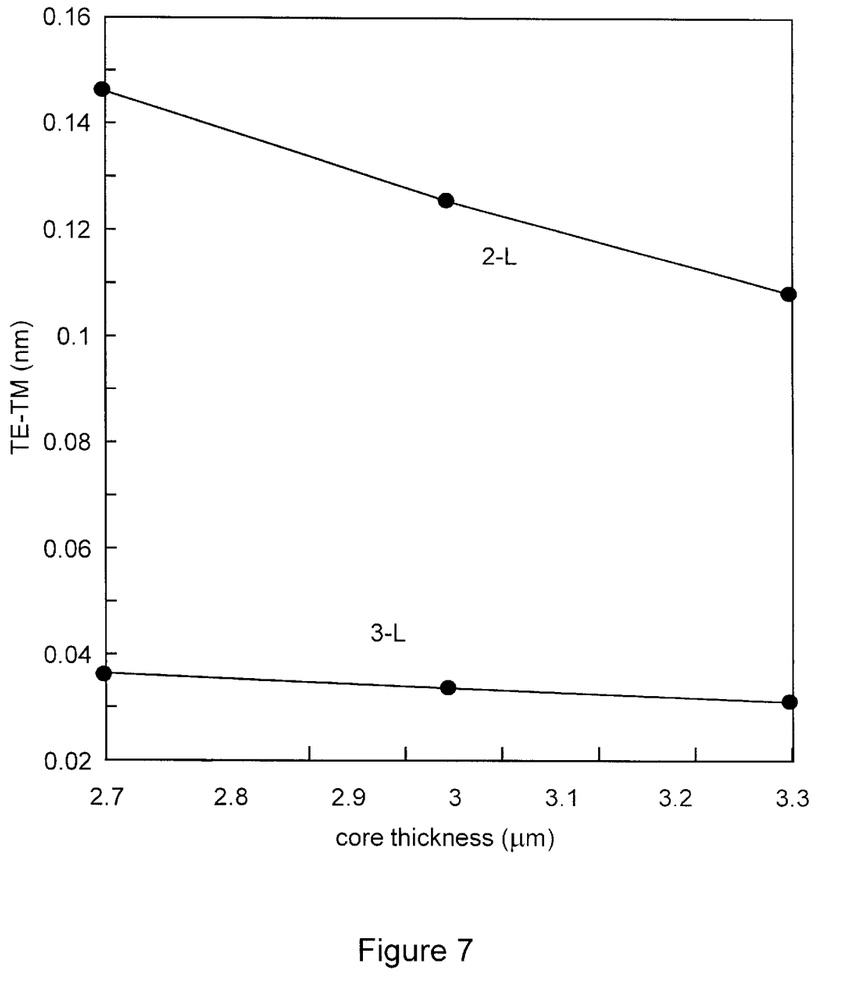
FIG. 7 is a plot of the birefringence induced splitting of the TE and TM modes for the two (2-L) and three (3-L) layer structure waveguides as a function of the undoped core thickness for a fixed doping concentration in the cladding layers.

Similarly, FIG. 7 illustrates the superior performance of the three layer as opposed to the two layer waveguide in terms of core thickness variations. In this case, the dopant level was kept fixed at $1.3 \times 10^{18} cm^{-3}$ and the effect of core thickness on birefringent splitting calculated. Clearly the three layer waveguide structure has much lower birefringence than the two layer structure (an average of 0.03 m as opposed to 0.12 nm) and much lower sensitivity to core thickness variations.

It will be evident to those of skill in the art that a waveguide structure that is less sensitive to manufacturing parameters such as core thickness and dopant concentration is easier to manufacture within design tolerances and, as such, is likely less costly to manufacture than a waveguide requiring exact composition and thickness. This reduced sensitivity of the waveguide structure allows for manufacturing use less costly techniques with substantially less loss due to quality control. As such, it is highly advantageous.

Since the inherent birefringence in the three layer structure is so low, the advantages of an etch stop layer can be added to the structure. The inclusion of an etch stop layer in the structure allows a wet etching technique to be used as the finishing step in the etching process, producing a more uniformly controlled etching depth across the wafer and( consequently a high production yield. Since the etch stop layer adds a small additional birefringence to the waveguide, it would be impossible to add this layer to the two layer waveguide without seriously degrading its already marginal performance. However, it produces a negligible change to the low birefringence of the three layer structure.

Alternatively, it many be possible to add an etch stop layer that reduces the overall birefringence when working with some materials. In either case, it is the effect of the etch stop layer on the index of refraction and, therefore, on the waveguide properties that is at issue.

Figure 8:
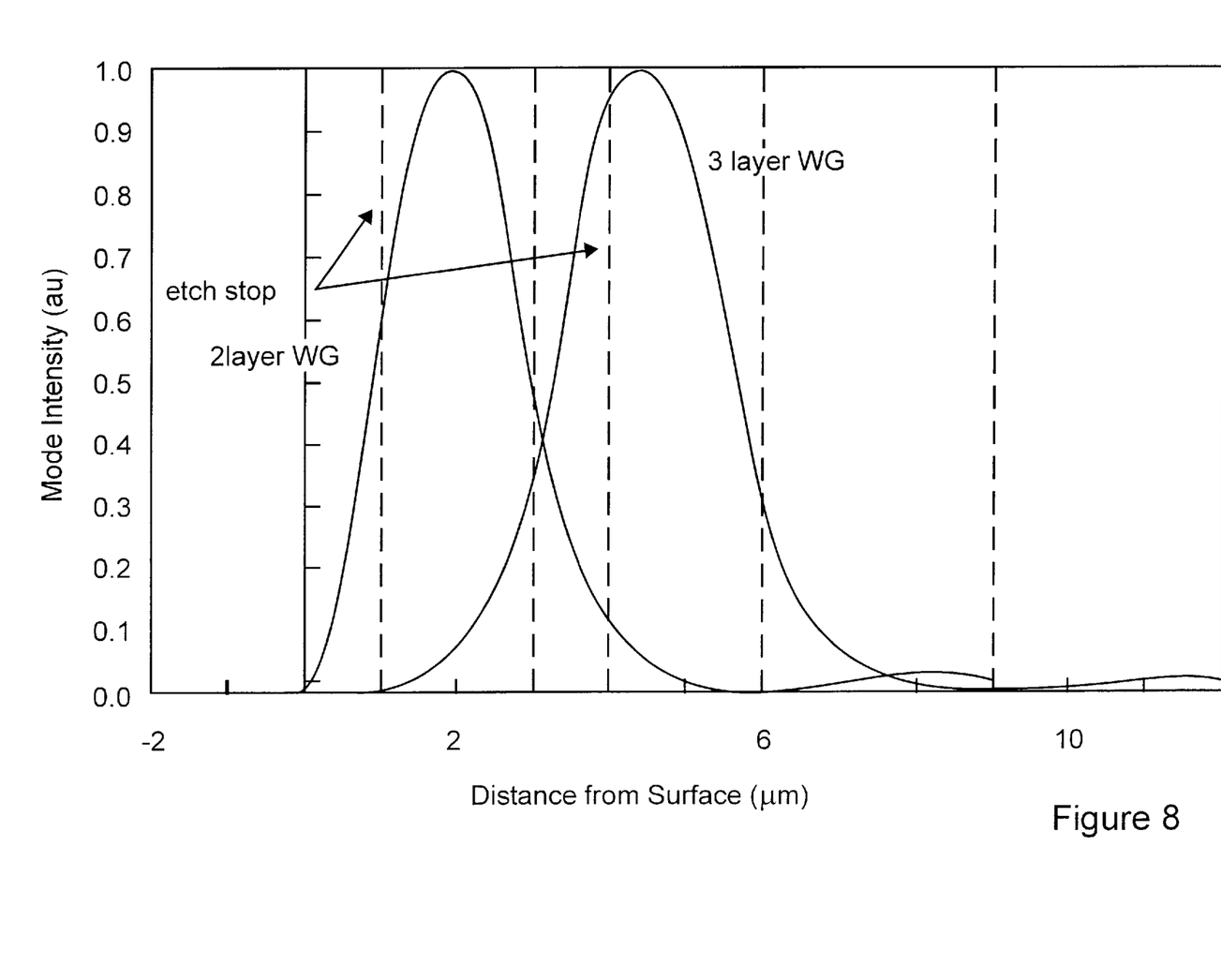
FIG. 8 is a plot illustrating the shape of the optical modes, perpendicular to the layers, for the two and three layer waveguide structures.

The calculated coupling efficiency between an optical fiber and a planar waveguide is a strong function of the thickness of the core guiding layer, varying from about 80% for a 2 μm thick core layer to lower than 10% for a 0.5 μm thick layer. Thus this new thicker design will decrease coupling loss by almost an order of magnitude. In addition, the symmetrical nature of the three layer structure produces a more symmetrical and wider (by about 20% in this example) optical mode than the two layer structure, as illustrated in FIG. 8. Thus optical coupling between a thick planar waveguide and an optical fiber mode will be more efficient for the three layer structure than the two layer structure.

Typically, the cladding layers are doped and the core is undoped. This is not necessarily the case. It is the indices of refraction that define the operational characteristics of the waveguide so, if a doped core has a higher index of refraction, it could be used as a core material. Also, it is possible that the core layer and the cladding layers are each doped, the core layer having a different concentration of dopants from the cladding layers.

Numerous other embodiments can be envisaged without departing from the spirit or scope of the invention.

What is claimed is:

1. A semiconductor waveguide structure comprising:
   a first cladding layer;
   a thick waveguide core layer adjacent the first cladding layer and having an approximately consistent thickness within some guiding regions thereof of at least 2 μm and less than 12 μm formed of waveguide material having an index of refraction higher than that of the first cladding layer; and,
   a second cladding layer of material similar in index of refraction to the first cladding layer and disposed on a side of the waveguide core layer opposite the first cladding layer,
   wherein the first cladding layer, the waveguide core, and the second cladding layer are all formed of semiconductor material wherein the refractive index difference between the waveguide core layer and the cladding layers is realized by way of doping of at least one of the layers.

2. A semiconductor waveguide structure as defined in claim 1 wherein the cladding layers are each doped to provide a lower refractive index than an undoped layer.

3. A semiconductor waveguide structure as defined in claim 2 wherein the core layer is undoped to provide a higher refractive index than the doped cladding layers.

4. A semiconductor waveguide structure as defined in claim 3 wherein the core layer has an index of refraction only slightly higher than that of the cladding layers.

5. A semiconductor waveguide structure as defined in claim 1 wherein the cladding layers each have approximately a same index of refraction.

6. A semiconductor waveguide structure as defined in claim 5 wherein the cladding layers each have substantially a same index of refraction.

7. A semiconductor waveguide structure as defined in claim 1 comprising a substrate including the first cladding layer wherein the core layer is disposed in contact with the substrate.

8. A semiconductor waveguide structure as defined in claim 7 wherein the entire substrate is doped with a dopant.

9. A semiconductor waveguide structure as defined in claim 1 comprising an etch stop layer disposed within at least the second cladding layer.

10. A semiconductor waveguide structure as defined in claim 1 comprising an etch stop layer disposed within at least the core layer.

11. A semiconductor waveguide structure as defined in claim 1 wherein the core is formed of a group III-V compound semiconductor.

12. A semiconductor waveguide structure as defined in claim 11 wherein the compound is InP.

13. A semiconductor waveguide structure as defined in claim 11 wherein the compound is GaIas.

14. A semiconductor waveguide structure as defined in claim 1 wherein the core is formed of a group IV semiconductor.

15. A semiconductor waveguide structure as defined in claim 14 wherein the group IV semiconductor is silicon.

16. A semiconductor waveguide structure as defined in claim 1 wherein the approximately consistent thickness is other than monotonically increasing in nature.

17. A semiconductor waveguide structure according to claim 1 wherein the first cladding layer, the waveguide core, and the second cladding layer are all formed of a same semiconductor material and the refractive index difference between the waveguide core layer and the cladding layers is realized by way of doping of at least one of the layers.

18. A semiconductor waveguide structure comprising:
   a substrate including a first doped cladding layer having a first index of refraction;
   a thick undoped waveguide core layer having an approximately consistent thickness within a guiding region thereof disposed on the substrate in contact with the first doped cladding layer, having a thickness of at least 2 μm and less than 12 μm, and having an index of refraction higher than that of the first doped cladding layer; and,
   a second doped cladding layer having an index of refraction similar to that of the first doped cladding layer and disposed on an opposing side of the waveguide core layer to the first doped cladding layer.

19. A semiconductor waveguide structure as defined in claim 18 comprising: an etch stop layer disposed within at least the core.

20. A semiconductor waveguide structure as defined in claim 18 comprising: an etch stop layer disposed within at least one of the first doped cladding layer and the second doped cladding layer.

21. A semiconductor waveguide structure as defined in claim 20 wherein the etch stop layer is within at least the second doped cladding layer.

22. A semiconductor waveguide structure as defined in claim 21 wherein the thickness of the first and second doped cladding layers, the placement of the etch stop layer, the thickness of the core layer, and the difference in indices of refraction between layers are selected to provide an approximately circular single mode.

23. A semiconductor waveguide structure as defined in claim 22 wherein the single approximately circular mode is mostly within the core having portions thereof within each of the first and second doped cladding layers.

24. A semiconductor waveguide structure as defined in claim 21 wherein the thickness of the first and second doped cladding layers, the placement of the etch stop layer, the thickness of the core layer, and the difference in indices of refraction between layers are selected to provide a waveguide structure having birefringence that is, in use, less than 5% of channel spacing.

25. A semiconductor waveguide structure as defined in claim 24 wherein the birefringence induced TE-TM at 1550 nm is less than 0.05 nm for a variation in doping concentration of $0.4e^{18} cm^{-3}$.

26. A semiconductor waveguide structure as defined in claim 24 wherein the birefringence induced TE-TM at 1550 nm varies less than .01 nm for a variation in doping concentration of $0.4e\ cm^{-3}$.

27. A semiconductor waveguide structure as defined in claim 21 wherein the thickness of the first and second cladding layers, the placement of the etch stop layer, the thickness of the core layer, and the difference in indices of refraction between layers are selected to provide a waveguide structure having birefringence that is near constant with small variations in core thickness.

28. A semiconductor waveguide structure as defined in claim 27 wherein the birefringence varies less than 0.01 nm for a variation in thickness of the waveguide core of 0.2 $\mu$m.

29. A semiconductor waveguide structure comprising:
 a substrate including a first doped cladding layer having a first index of refraction;
 a thick undoped waveguide core layer having an approximately consistent thickness within a guiding region thereof disposed on the substrate in contact with the first doped cladding layer, having a thickness of at least 2 $\mu$m, and having an index of refraction higher than that of the first doped cladding layer; and,
 a second doped cladding layer having an index of refraction similar to that of the first doped cladding layer and disposed on an opposing side of the waveguide core layer to the first doped cladding layer.

* * * * *